United States Patent
Karl

(10) Patent No.: US 9,963,183 B2
(45) Date of Patent: May 8, 2018

(54) HOLDING APPARATUS FOR A DEVICE

(71) Applicant: Delta Cycle Corporation, Randolph, MA (US)

(72) Inventor: Philip J. Karl, Rehoboth, MA (US)

(73) Assignee: Delta Cycle Corporation, Randolph, MA (US)

( * ) Notice: Subject to any disclaimer, the term of this patent is extended or adjusted under 35 U.S.C. 154(b) by 0 days. days.

(21) Appl. No.: 15/269,016

(22) Filed: Sep. 19, 2016

(65) Prior Publication Data

US 2017/0120980 A1    May 4, 2017

Related U.S. Application Data

(60) Provisional application No. 62/250,631, filed on Nov. 4, 2015.

(51) Int. Cl.
*B62J 7/06* (2006.01)
*B62J 11/00* (2006.01)
*H04B 1/3888* (2015.01)

(52) U.S. Cl.
CPC .............. *B62J 11/00* (2013.01); *H04B 1/3888* (2013.01)

(58) Field of Classification Search
CPC .............. B62J 7/06; B62J 9/003; B62J 9/006
USPC .................................. 224/420, 425, 427, 440
See application file for complete search history.

(56) References Cited

U.S. PATENT DOCUMENTS

| 5,127,562 A | 7/1992 | Zane et al. |
| 5,226,341 A | 7/1993 | Shores |
| 5,276,596 A | 1/1994 | Krenzel |
| 5,395,018 A * | 3/1995 | Studdiford ............... B62H 5/00 224/420 |
| 5,797,613 A | 8/1998 | Busby |
| 5,903,645 A | 5/1999 | Tsay |
| 5,947,499 A | 9/1999 | Busby |
| 6,092,823 A | 7/2000 | Busby |
| 6,543,957 B1 | 4/2003 | Raspotnig |
| 6,719,254 B1 | 4/2004 | Speiser |
| 6,843,456 B1 | 1/2005 | Hajianpour |

(Continued)

FOREIGN PATENT DOCUMENTS

| CN | 1647986 A | 8/2005 |
| CN | 203142867 | 8/2013 |

(Continued)

OTHER PUBLICATIONS

Delta Cycle Corp Smartphone Mount for Bikes, by Delta Cycle, http://www.amazon.com/Delta-Cycle-Smartphone-Mount-Bikes/sim/B0050TCKUE/2, 1996-2014, five (5) pages.

(Continued)

*Primary Examiner* — Brian D Nash
(74) *Attorney, Agent, or Firm* — Iandiorio Teska & Coleman, LLP

(57) ABSTRACT

A holding apparatus for a device is featured including a base plate. A securing device is attachable to a round bar, a cylindrical bar, or a square tube. At least one flexible member includes a plurality of flexible loops. A top plate is configured to engage the base plate to secure the flexible member between the base plate and the top plate, each of the plurality of flexible loops is configured to extend over a portion of a device to secure the device to the top plate.

14 Claims, 8 Drawing Sheets

(56) References Cited

U.S. PATENT DOCUMENTS

| | | | |
|---|---|---|---|
| 6,888,940 B1* | 5/2005 | Deppen | B60R 11/0241 379/446 |
| 7,000,811 B2 | 2/2006 | Gilstrap et al. | |
| 7,077,302 B2* | 7/2006 | Chuang | B62J 11/00 224/271 |
| 7,123,450 B1 | 10/2006 | Villiard | |
| 8,469,248 B2 | 6/2013 | Weng et al. | |
| 8,733,721 B2 | 5/2014 | Lacerte et al. | |
| 8,752,800 B2 | 6/2014 | Lacerte et al. | |
| 8,960,634 B2 | 2/2015 | Le Gette et al. | |
| 8,998,048 B1 | 4/2015 | Wu | |
| 2002/0113185 A1 | 8/2002 | Ziegler | |
| 2003/0233736 A1 | 12/2003 | Faerber et al. | |
| 2005/0045681 A1* | 3/2005 | Hancock | B60R 11/0205 224/401 |
| 2007/0221694 A1 | 9/2007 | Aguiliar et al. | |
| 2009/0173858 A1 | 7/2009 | LaCerte et al. | |
| 2009/0212189 A1 | 8/2009 | Carnevali | |
| 2010/0248897 A1 | 9/2010 | Hsiao et al. | |
| 2010/0264182 A1 | 10/2010 | Perlman et al. | |
| 2011/0062199 A1* | 3/2011 | Liu | B62J 7/06 224/420 |
| 2012/0018595 A1 | 1/2012 | Berry | |
| 2012/0024619 A1 | 2/2012 | Lin | |
| 2012/0061537 A1 | 3/2012 | LaCerte et al. | |
| 2012/0199501 A1 | 8/2012 | Le Gette et al. | |
| 2012/0241572 A1 | 9/2012 | McClain et al. | |
| 2013/0181101 A1 | 7/2013 | Avganim | |
| 2013/0193174 A1 | 8/2013 | Ackeret et al. | |
| 2013/0214019 A1 | 8/2013 | Wu | |
| 2013/0248569 A1 | 9/2013 | Hsu | |
| 2013/0279098 A1* | 10/2013 | Cho | H05K 7/00 361/679.01 |
| 2014/0042285 A1 | 2/2014 | Carnevali | |
| 2014/0191099 A1 | 7/2014 | Schwarz | |
| 2014/0221055 A1 | 8/2014 | Wu | |
| 2014/0346202 A1 | 11/2014 | McClain et al. | |
| 2015/0129729 A1 | 5/2015 | LaCerte et al. | |
| 2015/0163936 A1 | 6/2015 | Le Gette et al. | |
| 2015/0282343 A1 | 10/2015 | Downes et al. | |
| 2016/0368557 A1 | 12/2016 | Downes et al. | |

FOREIGN PATENT DOCUMENTS

| | | |
|---|---|---|
| CN | 203332288 U | 12/2013 |
| CN | 203813843 U | 9/2014 |
| WO | WO 2014/146151 A1 | 9/2014 |

OTHER PUBLICATIONS

360 Degree Rotatable Cell Phone Holder for Bicycle, by VarichLotus, http://www.amazon.com/Degree-Rotatable-Phone-Holder-Bicycle/dp/BOOEA1GF72/ref=sr_1_2?ie=UTF8 &qid=1398713446&sr=8-2 &keywords=360+Degree+Rotatable+Cell+Phone+Holder+for+ Bicycle, 1996-2014, three (3) pages.

iOttie One-Touch Bike Mount Holder for iPhone 4S 4 3GS iPod Touch Samsung Galaxy S4 S3 S2 Nokia Lumina 920 HTC OneX EVO 4G Rhyme Droid Razr Maxx Google Nexus LG Optimus G Blackberry Z10 Torch Compact Size GPS, by iOttie, http://www. amazon.com/iOttie-One-Touch-Samsung-Optimus-BlackBerry/dp/ B007FHCR20, 1996-2014, six (6) pages.

Mountek nGroove Universal CD Slot Mount for Cell Phones and GPS Devices, by Mountek, http://www.amazon.com/Mountek-nGroove-Universal-Phones-Devices/dp/B004G1L52Q, 1996-2014, six (6) pages.

Delta Smart Phone Caddy, White, http://www.amazon.com/Delta-Smart-Phone-Caddy-II/dp/B00A3EV372, Brand: Delta Cycle, 1996-2014, four (4) pages.

* cited by examiner

HOLDING APPARATUS FOR A DEVICE

RELATED APPLICATIONS

This application claims benefit of and priority to U.S. Provisional Application Ser. No. 62/250,631 filed Nov. 4, 2015, under 35 U.S.C. § § 119, 120, 363, 365, and 37 C.F.R. § 1.55 and § 1.78, which is incorporated herein by this reference.

BACKGROUND OF THE INVENTION

One conventional holding apparatus for holding a multimedia device to a handlebar of a bicycle includes a stretchable mount looped around a handlebar of a bicycle. The stretchable mount includes stretchable bands which engage the corners of the multi-media device, e.g., a cell phone, to secure the device to the handlebar. See, WO 2014/0146151, incorporated by reference herein. However, due to the flexible design and lack of any type of rigidity, consumers may not actually believe the device will work. Additionally, when the device is removed from the mount, the strap simply rests on the handlebar may easily fall off.

Another conventional device for securing a smart phone to a handlebar of a bicycle relies on a U-shaped support and an elastic stretchable web-like member that loops around corners of the phone to secure the phone into the U-shaped member. However, this device is complex, cumbersome, bulky, and may not necessarily be reliable.

BRIEF SUMMARY OF THE INVENTION

In one aspect, a holding apparatus for a device is featured including a base plate including a securing device attachable to a round bar, a cylindrical bar, or a square tube. At least one flexible member includes a plurality of flexible loops. A top plate is configured to engage the base plate to secure the flexible member between the base plate and the top plate, each of the plurality of flexible loops is configured to extend over a portion of a device to secure the device to the top plate.

In one embodiment, the top plate may include a plurality of teeth configured to engage sections of the base plate. The top plate may include a plurality of openings. The flexible member may include a plurality of extensions configured to engage the plurality of openings in the top plate. The openings may be circular shaped. The extensions may be cylindrically shaped to engage the openings. The base plate may be made of a rigid material. The top plate may be made of a rigid material. The flexible member may be made of a flexible material. The base plate and the securing device may be integrated.

The portion of the device may include a corner of the device. The device may include an electronic device. The electronic device may include one or more of a smart phone, a cell phone, a tablet, an electronic device, or a multi-media device. The round bar may include a handlebar.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
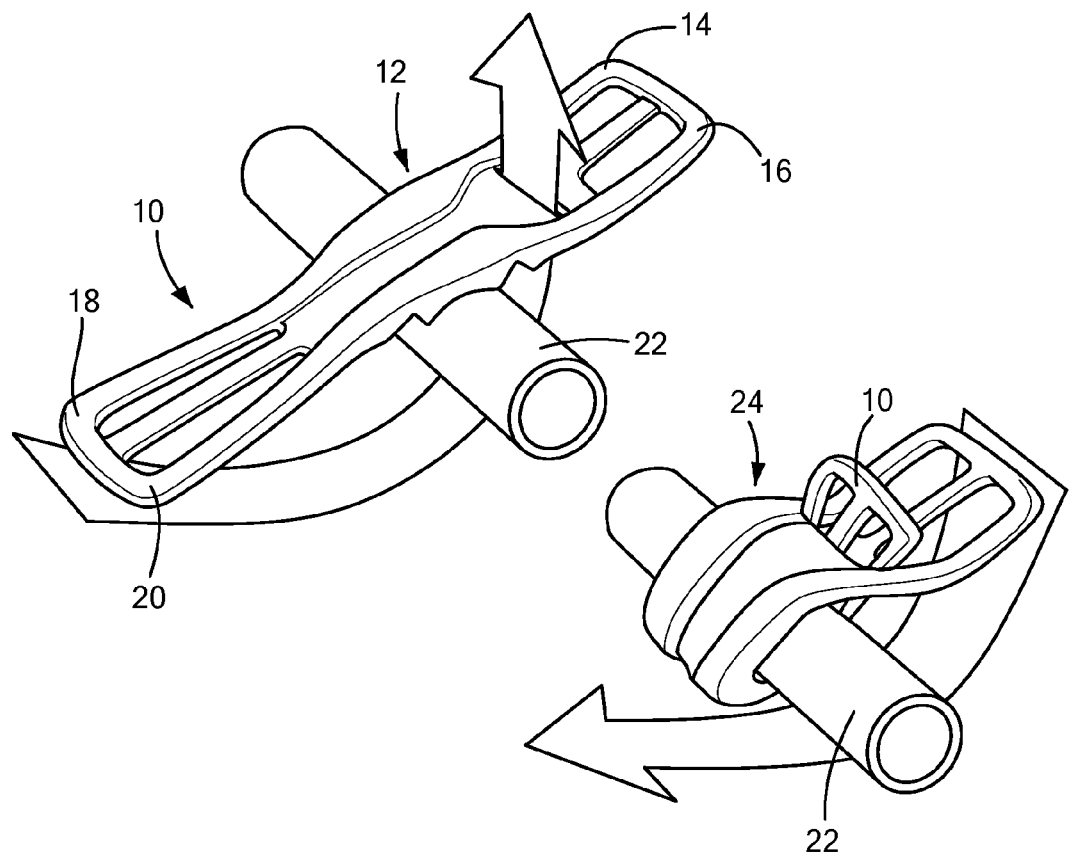
FIG. 1 shows various views of one example of a conventional holding apparatus for a smart phone.
Figure 1:
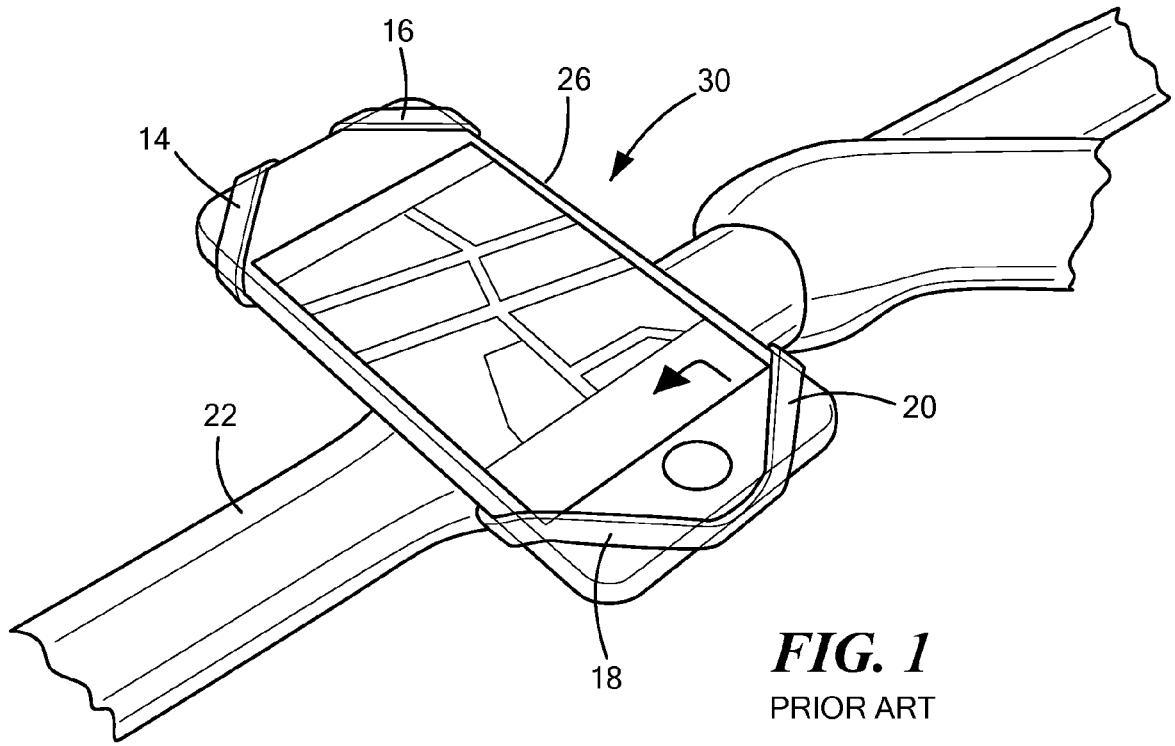

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section, conventional holding apparatus 10, FIG. 1, e.g., as disclosed in WO 2014/0146151, relies on flexible mount 12 with extendable loop sections 14, 16, 18, and 20. In use, flexible mount 12 loops around handlebar 22 of a bicycle as shown at 24 and loops 14, 16, 18, and 20 engage device 26 as shown at 30, e.g., a multi-media device, such as a smart phone, to secure device 26 to handlebar 22. However, because apparatus 10 is completely flexible, it may result in device 26 moving when in use and may be unreliable. Additionally, when device 26 is removed, device 10 may fall off handlebar 22.

Figure 2:
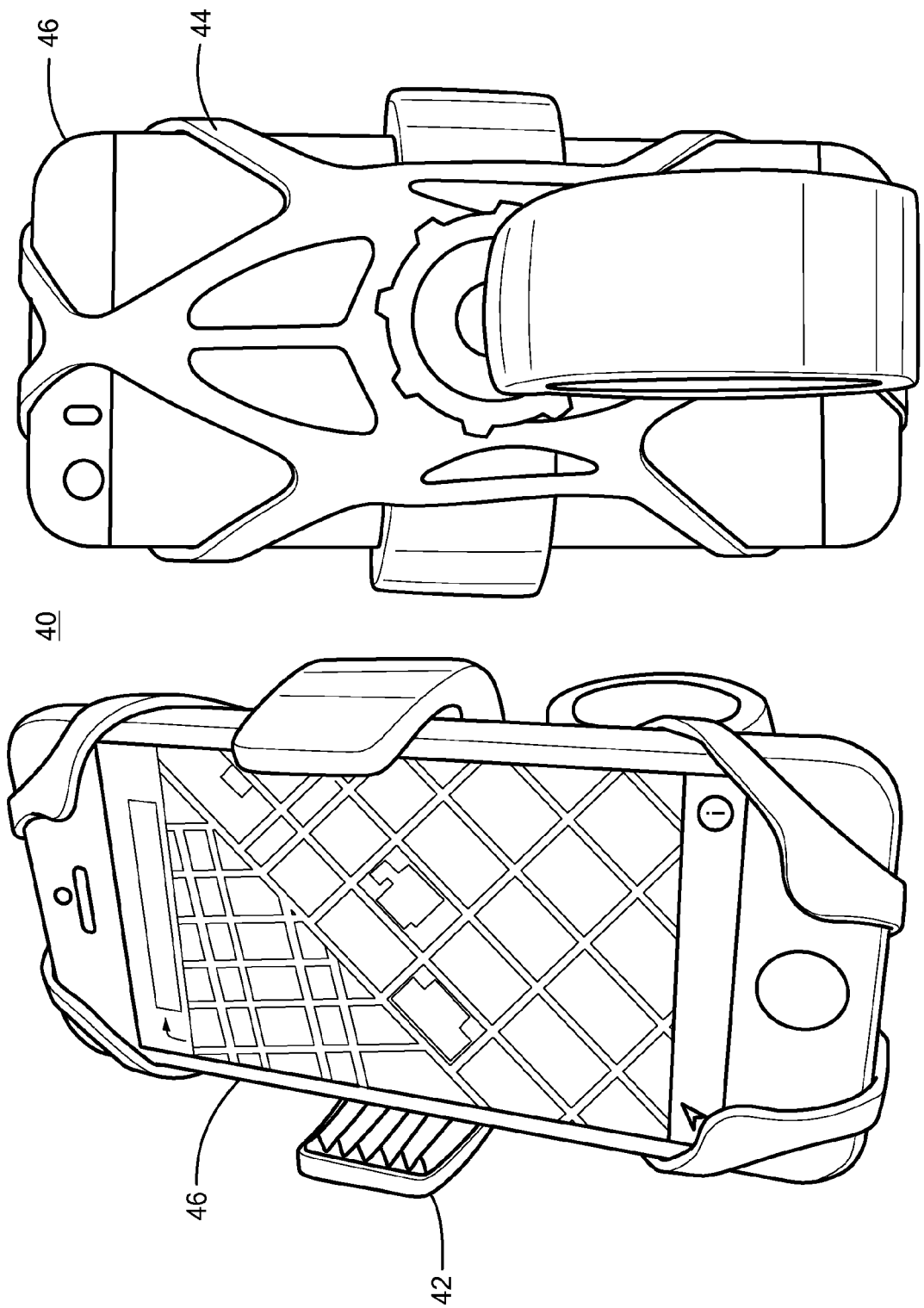
FIG. 2 shows views of another example of a conventional holding apparatus for a smart phone.

Conventional holding device 40, FIG. 2, relies on U-shaped member 42 and stretchable web-like member 44 to engage smart phone 46 as shown. However, device 40 is complex, large, bulky, and may not often be reliable.

Figure 3:
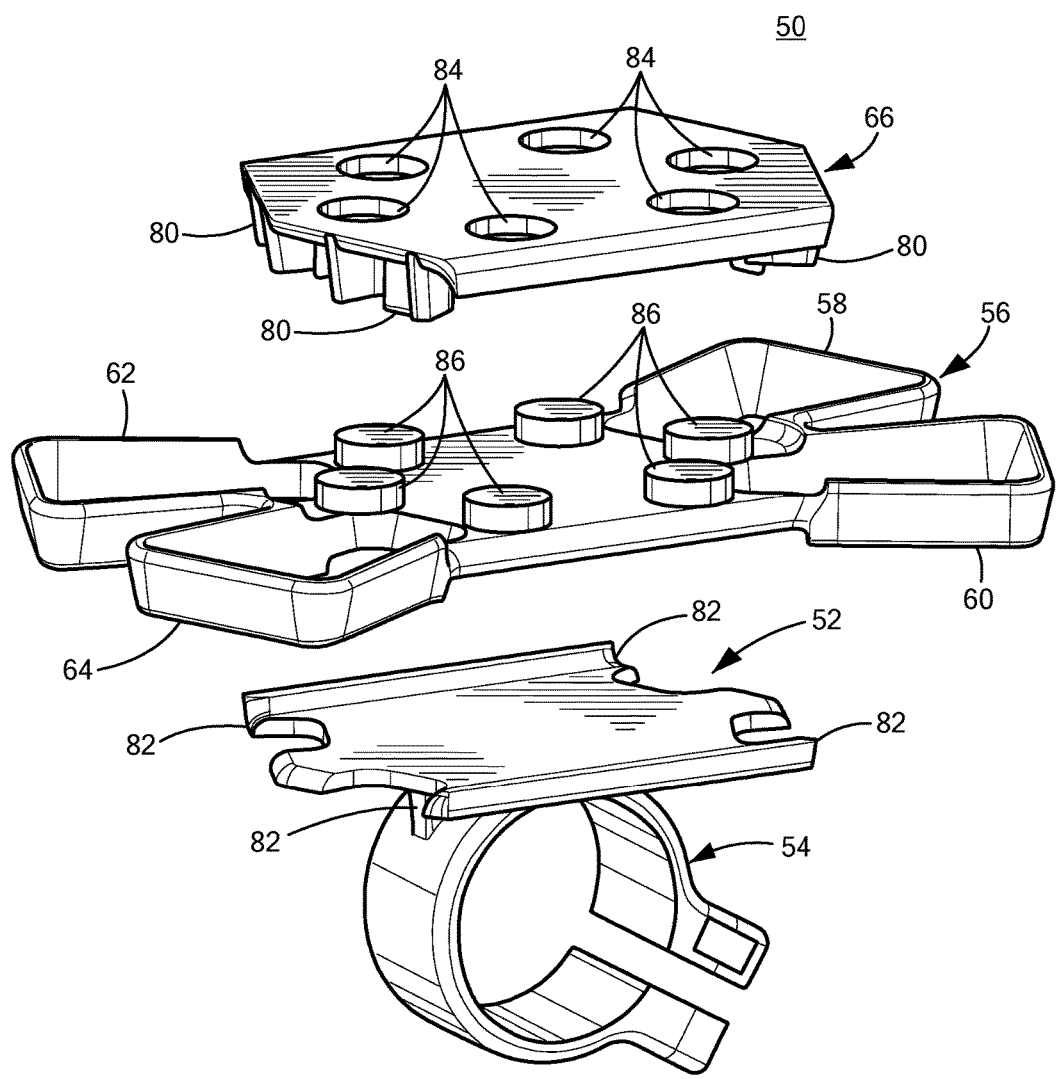
FIG. 3 is a three-dimensional front view showing the primary components associated with one embodiment of the holding apparatus for a device of this invention.
Figure 4:
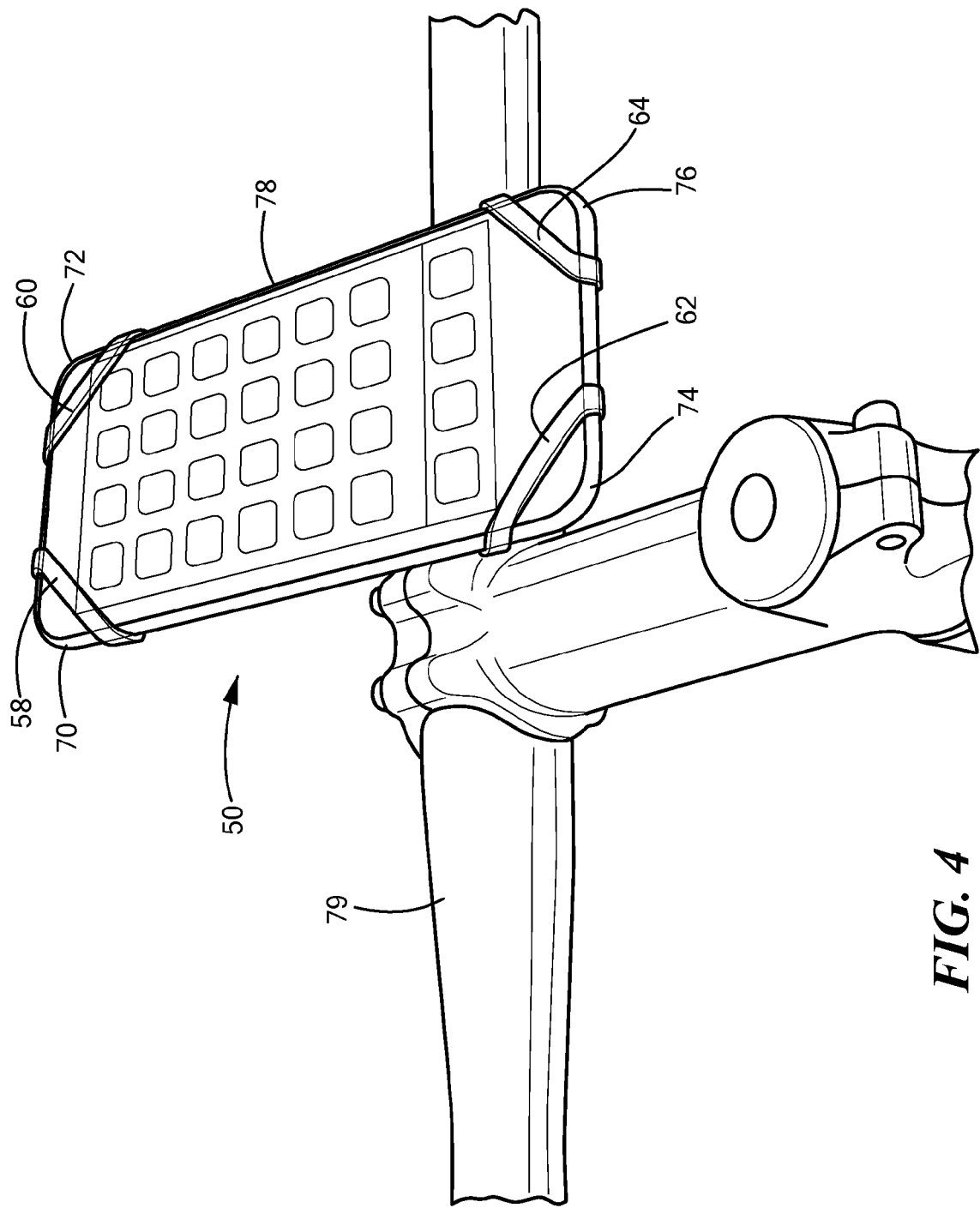
FIG. 4 is a three-dimensional front view showing one example of the securing device shown in FIG. 3 attached to a bicycle handlebar.
Figure 5:
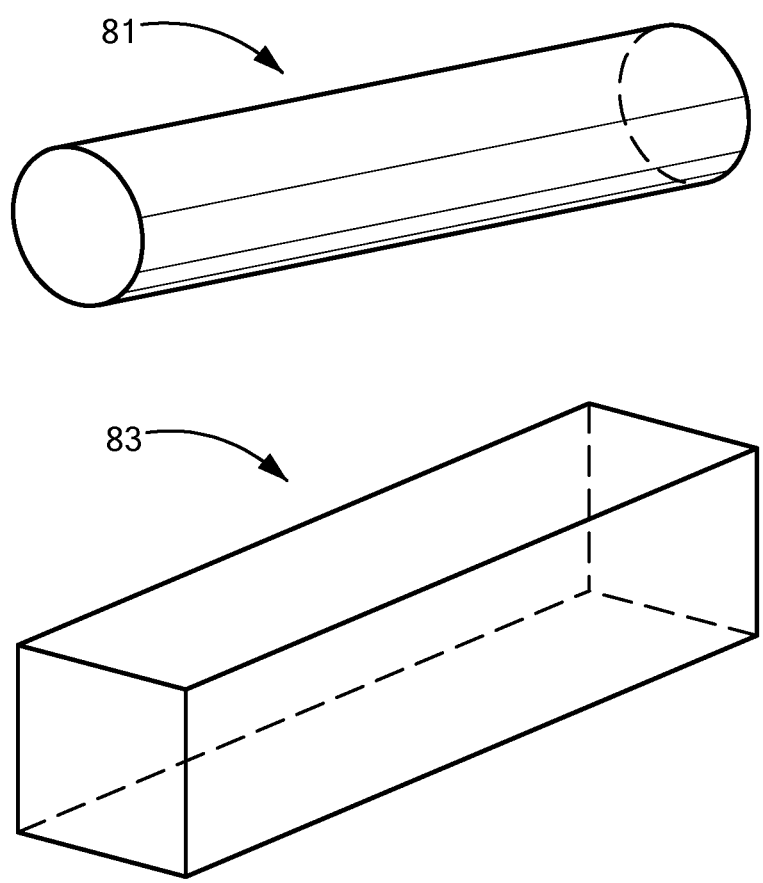
FIG. 5 shows a schematic views of a cylindrical bar and a square tube which may be secured by the securing device shown in FIG. 3.

There is shown in FIG. 3, one embodiment of holding apparatus 50 for a device of this invention. Holding apparatus 50 includes base plate 52 which includes securing device 54, e.g., a clamp or similar type device, attachable to a round bar, such as a handlebar 79, FIG. 4, of a bicycle motorcycle or similar type device, or to cylindrical bar 81, FIG. 5, or a square tube 83 in which each clamp 54, FIG. 3, is modified to accommodate square tube 83 as shown in FIG. 5.

Holding apparatus 50, FIG. 3, also includes at least one flexible member 56 including a plurality of flexible loops 58, 60, 62, and 64. Flexible member 56 is preferably made of an elastic stretchable material, such as silicone or similar type stretchable material.

Figure 6:
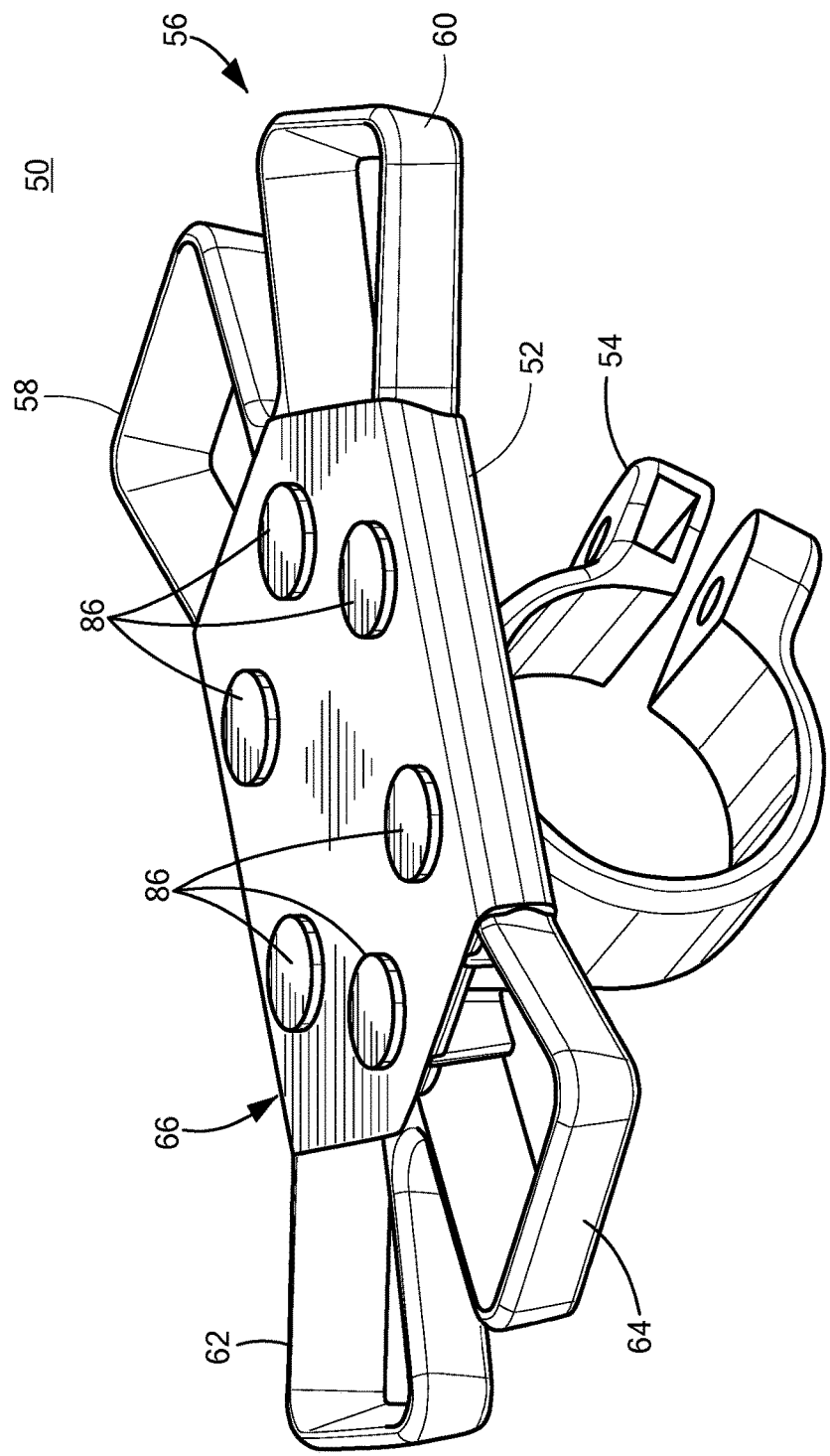
FIG. 6 is a three-dimensional front view showing one example of the securing device shown in FIG. 3 is the assembled position.
Figure 7:
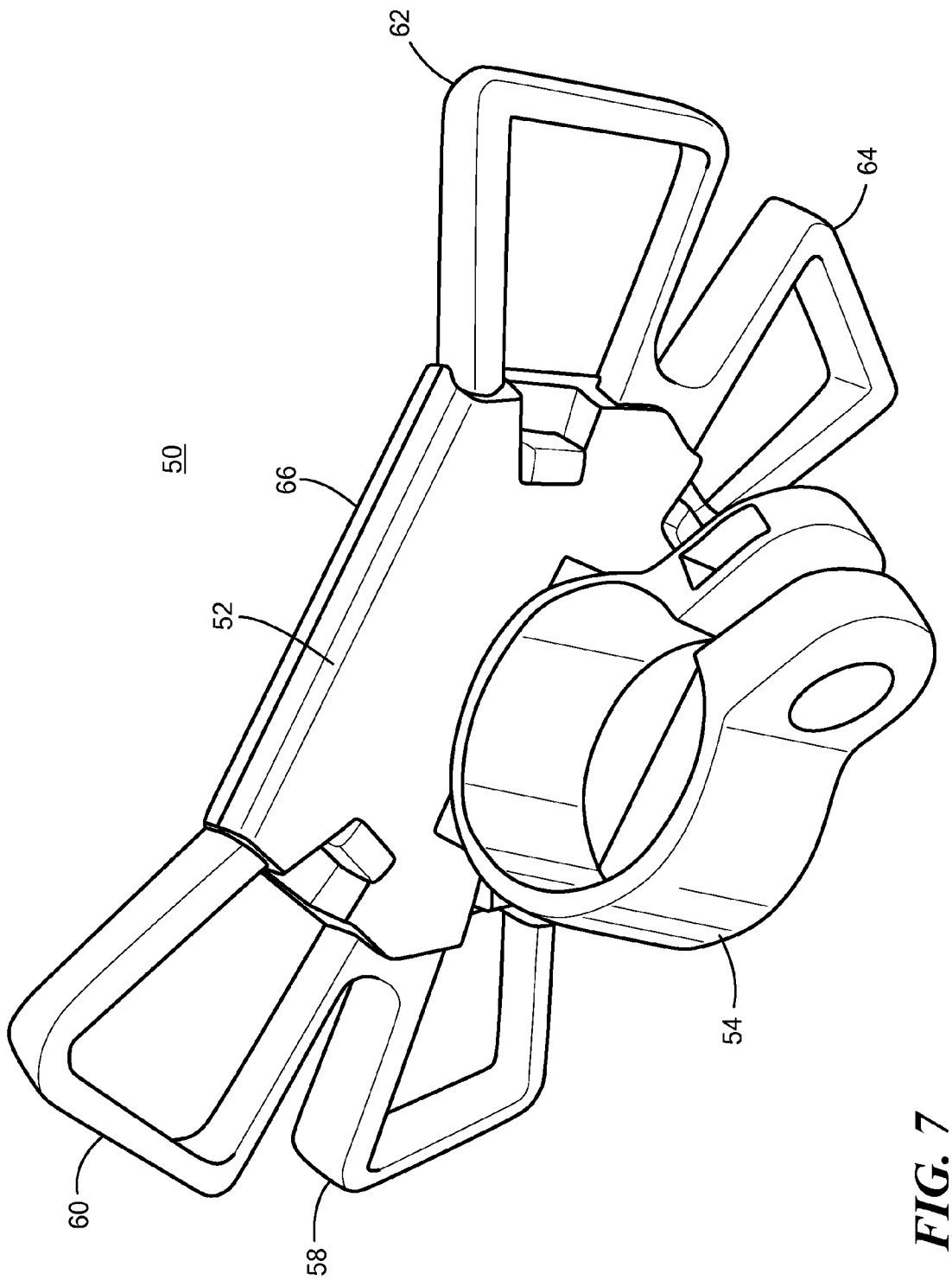
FIG. 7 is a three-dimensional bottom of the holding apparatus for a device shown in FIG. 3.

Holding apparatus 50 also includes top plate 66 configured to engage base plate 52 to secure flexible member 56 between top plate 66 and base plate 52, e.g., as shown in FIG. 6. Each of the plurality of flexible loops 58, 60, 62, and 64, FIGS. 3 and 7, is configured to extend over a portion of a device to secure the device to top plate 66. For example, flexible loops 58, 60, 62, 64 may extend over corners 70, 72, 74, 76, FIG. 4, respectively, of device 78, in this example, a smart phone, tablet, or cell phone, to secure device 78 to top plate 66, FIGS. 3 and 7, coupled to a round bar, e.g., bicycle handlebar 79, FIG. 3, cylindrical bar 81, FIG. 5, or square tube 83. In other examples, device 78, FIG. 4, may be any electronic type of device, such as a cell phone, tablet, or similar type multimedia device, or may be any type of device which needs to be secured to top plate 66 coupled to round bar 79, cylindrical bar 81 or square tube 83. Although as shown above in FIG. 3, flexible member 56 is shown as a single piece, in another design, flexible member 56 may be comprised of a plurality of pieces each having one or more flexible loops that are housed between top plate 66 and bottom plate 52.

FIG. 7, where like parts have been given like numbers, shows a bottom view of holding apparatus 50.

Figure 8:
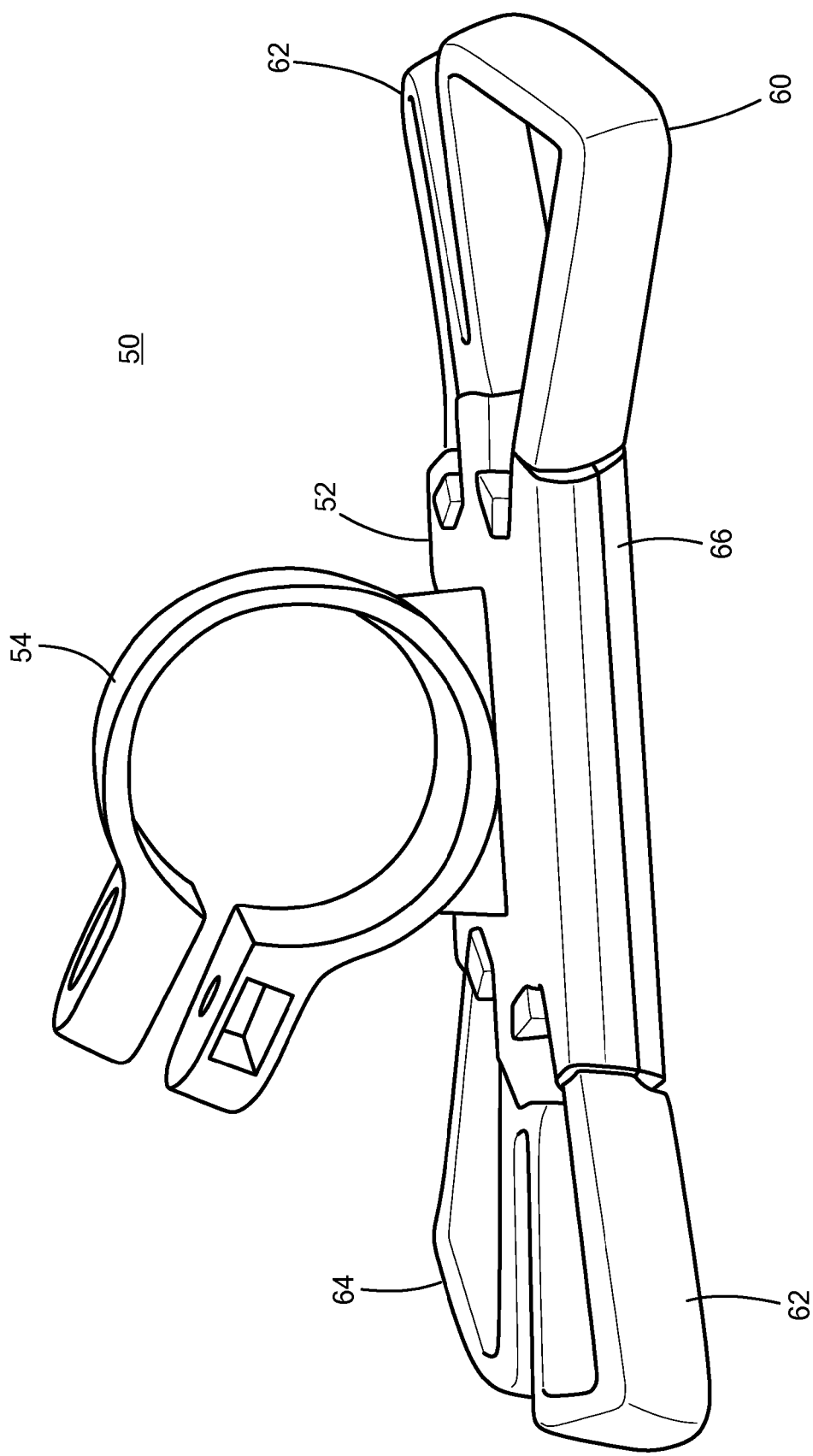
FIG. 8 is a three-dimensional side view of the holding apparatus shown in FIG. 3.

FIG. 8, where like parts include like numbers, shows a side view of holding apparatus 50.

In one design, top plate 66, FIG. 3, preferably includes a plurality of teeth 80 which engage sections 82 of base plate 52 to secure top plate 66 to bottom plate 52 and sandwich flexible member 56 there between as shown in FIGS. 6-8. In one design, top plate 66, FIG. 3, preferably includes a plurality of openings 84 and flexible member includes a plurality of extensions 86, e.g., cylindrically shaped extensions as shown, which are configured to engage openings 84 when top plate 66 engages base plate 52, e.g., as shown in FIG. 7.

Preferably, base plate 52 and top plate 66 are made of a rigid material, such as plastic or similar type materials.

The result is holding apparatus 50 for a device of this invention provides a simple, reliable, and effective way to secure a device, such as a smart phone, cell phone, tablet, or any similar type device to a round bar, such as the handlebar of a bicycle, motorcycle, or a cylindrical tube or square tube. Holding apparatus provides consumers with confidence that apparatus 50 will operate effectively to secure a device thereto and will not fall off because it is clamped to a round bar with the securing device. Additionally, apparatus 50 has a sleek, simple design and is easy to use.

Thus, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A holding apparatus for a device comprising:
   a base plate including a securing device attachable to a round bar, a cylindrical bar, or a square tube;
   at least one flexible member including a plurality of flexible loops;
   a top plate configured to engage the base plate to secure the flexible member between the base plate and the top plate, the top plate including a plurality of teeth configured to engage sections of the base plate; and
   wherein each of the plurality of flexible loops is configured to extend over a portion of a device to secure the device to the top plate.

2. The apparatus of claim 1 in which the top plate includes a plurality of openings.

3. The apparatus of claim 2 in which the flexible member includes a plurality of extensions configured to engage the plurality of openings in the top plate.

4. The apparatus of claim 3 in which the openings are circular shaped.

5. The apparatus of claim 4 in which the extensions are cylindrically shaped to engage the openings.

6. The apparatus of claim 1 in which the base plate is made of a rigid material.

7. The apparatus of claim 1 in which the top plate is made of a rigid material.

8. The apparatus of claim 1 in which the flexible member is made of a flexible material.

9. The apparatus of claim 1 in which the base plate and the securing device are integrated.

10. The apparatus of claim 1 in which the portion of the device over which the plurality of flexible loops is configured to extend includes a corner portion of the device.

11. The apparatus of claim 1 in which the device includes an electronic device.

12. The apparatus of claim 11 in which the electronic device includes one or more of a smart phone, a cell phone, a tablet, an electronic device, or a multi-media device.

13. The apparatus of claim 1 in which the securing device is attachable to a round handlebar.

14. A holding apparatus for a device comprising:
   a top plate including a plurality of openings therein and a plurality of teeth extending therefrom,
   a base plate including sections therein for the top plate plurality of teeth to engage, the base plate also including a clamp attachable to a handlebar;
   a flexible member sandwiched between the top plate and the base bottom plate, the flexible member including:
      extensions to engage with the openings of the top plate, and
      flexible loops configured to extend over portions of a device to secure
   the device to the top plate.

* * * * *